United States Patent
Nagel et al.

[11] Patent Number: 6,163,529
[45] Date of Patent: Dec. 19, 2000

[54] TRANSMISSION SYSTEM WITH LINE STATUS DETERMINATION INDEPENDENT OF RECEIVED PACKET ORDER

[75] Inventors: Peter Nagel, Erlangen; Hans-Georg Keller, Nürnberg, both of Germany

[73] Assignee: U.S. Philips Corporation, New York, N.Y.

[21] Appl. No.: 08/576,539

[22] Filed: Dec. 21, 1995

[30] Foreign Application Priority Data

Dec. 23, 1994 [DE] Germany .............................. 44 46 248

[51] Int. Cl.[7] ...................................................... H04Q 1/20
[52] U.S. Cl. ............................................................ 370/244
[58] Field of Search ................................. 370/13, 14, 15, 370/16, 60.1, 94.2, 110.1, 111, 216, 217, 218, 241, 242, 244, 250, 395, 410, 522, 528; 340/825.16, 825.17; 371/20.1, 20.2, 42, 46, 47.1

[56] References Cited

U.S. PATENT DOCUMENTS

| | | | |
|---|---|---|---|
| 5,321,688 | 6/1994 | Nakano et al. ........................ | 370/110.1 |
| 5,343,462 | 8/1994 | Sekihata et al. ........................ | 370/60.1 |
| 5,461,607 | 10/1995 | Miyagi et al. ............................. | 370/16 |
| 5,475,696 | 12/1995 | Taniguchi .................................. | 371/42 |
| 5,553,057 | 9/1996 | Nakayama ............................. | 370/60.1 |

FOREIGN PATENT DOCUMENTS

0472408A2 2/1992 European Pat. Off. .
0518199A2 12/1992 European Pat. Off. .

OTHER PUBLICATIONS

"ATM—Die Technik des Breitband–ISDN", by Gert Sigmund, R v. Decker's Verlag, G. Schenck, Heidelberg, 1993, pp. 133 to 137.

*Primary Examiner*—Chau Nguyen
*Attorney, Agent, or Firm*—David R. Treacy

[57] ABSTRACT

A transmission system comprises a plurality of network nodes which for receiving and transmitting packets which contain connection-related status information about the transmission system. A network node comprises at least one evaluation unit which stores status information extracted from a packet in a table. Furthermore, irrespective of the order of the received packets, the evaluation unit determines current, connection-related statuses in a given order for each connection, based upon the statuses also stored in the table and determined thus far, as well as on the received connection-related status information signals.

4 Claims, 1 Drawing Sheet

TRANSMISSION SYSTEM WITH LINE STATUS DETERMINATION INDEPENDENT OF RECEIVED PACKET ORDER

BACKGROUND OF THE INVENTION

1. Field of the Invention

The invention relates to a transmission system comprising a plurality of network nodes which are provided each for receiving and transmitting packets which contain connection-related status information signals about the transmission system.

2. Discussion of the Related Art

Such a transmission system comprising a plurality of network nodes is known from the title "ATM—Die Technik des Breitband-ISDN" by Gert Sigmund, R v. Decker's Verlag, G. Schenck, Heidelberg, 1993, pp. 133 to 137. Such network nodes may be, for example, switching centres, cross-connects or regenerative repeaters. Data or information signals are then transmitted between the network nodes in fixed-length packets (cells) in the asynchronous transfer mode. The packets or cells may then be transported in a synchronous transport module (STM) which forms part of a signal according to the standard of the synchronous digital hierarchy (SDH) or according to the standard of the synchronous optical network (SONET). A cell consists of a 5-byte-long header field which contains control information, and a 48-byte-long information field. The control information in the header field of a cell contains a Virtual Path Identifier (VPI) which indicates a virtual path (VP), and a Virtual Connection Identifier (VCI) within a virtual path, which indicates a Virtual Connection (VC). A plurality of VCs are combined to become a virtual path.

To ensure proper operation, to ensure that error conditions are signalled and monitor information signals (for example, with respect to the availability and efficiency of the system) are transported, cells carrying OAM data (OAM cells) in their information field are exchanged between the network nodes (OAM=Operations Administration and Maintenance). How such OAM cells are evaluated in a network node is not known from above title.

SUMMARY OF THE INVENTION

Therefore, it is an object of the invention to provide a transmission system comprising a plurality of network nodes in which OAM cells are evaluated.

A transmission system of the type defined in the opening paragraph achieves the object in that a network node comprises at least one evaluation unit which:
stores status information signals extracted from a packet in a table and
irrespective of the order of the received packets, determines current, connection-related statuses in a given order for each connection based upon the statuses also stored in the table and determined thus far, as well as on the received connection-related status information signals.

According to the invention a network node includes an evaluation unit for one line, which unit determines what type of packet or cell is present. It is possible that a network node includes further evaluation units for further lines. If a packet contains connection-related status information signals, it will be an OAM cell. Such status information signals may be, for example, AIS or RDI information signals in the information field of a cell. The AIS (AIS=Alarm Indication Signal) information signal indicates, for example, that there is a line defect, and the RDI (RDI=Remote Defect Indication) information signal, for example, that there is a line defect in the opposite direction. These status information signals and further data (VPI, VCI and so on) are stored in a table.

In addition to this current cell processing, the evaluation unit carries out a postprocessing or background processing. During this postprocessing, stored data are taken from the table for a VP or VC and at least one current status is computed. Such a status indicates, for example, that a line defect has occurred. A presupposition is then that such a status information signal (for example, AIS information) has been announced by OAM cells. If one or more current statuses have been determined for a specific VP or VC, first the current statuses of all the other VPs or VCs are evaluated before the current statuses of above-mentioned specific VP or VC are determined again.

When the statuses are computed, it may happen that OAM cells must be generated by the evaluation unit and sent. As a result of said type of postprocessing, cells of a specific VP or VC are sent a certain period of time apart, so that aregular cell stream develops and the danger of a cell jam is reduced.

To evaluate cells that have been transmitted in the asynchronous transfer mode, the evaluation unit includes a recognition circuit at least for recognizing the type of cell, the Virtual Path (VP) and—if available—the Virtual Connection (VC), and an extraction circuit. At least for specific OAM cells, this extraction circuit is arranged for extracting status information signals and for transferring the status information signals to the table.

The evaluation unit further includes a postprocessing circuit which periodically extracts data relating to a connection from the table, determines and stores in the table current, connection-related statuses, and, in the case of certain statuses, sends a control command to a further generator circuit to have it generate OAM cells, which further generator circuit is included in the evaluation unit. One period corresponds to the duration necessary for computing the statuses of all the connections. This is understood to mean that all possible VPs and VCs are processed consecutively in equidistant time slots.

The evaluation unit includes a generator circuit which generates OAM cells. These cells are fed either to a switching network in the network node or to a line. The cells which are to be fed to the line must first be applied to a multiplexer which receives cells either coming from the switching network or coming from the generator circuit. The cells coming from the generator circuit have priority. Therefore, cells simultaneously arriving from the switching network must be buffered in a buffer store included in the evaluation unit. The evaluation unit further includes another multiplexer which transfers either cells coming from the extraction circuit, or priority cells coming from the generator circuit to the switching network. For buffering the cells coming from the extraction circuit, the evaluation unit includes a further buffer store. Because the cells in the generator circuit are generated regularly and in a controlled manner, the buffer stores may be small-capacity buffer stores.

In a further embodiment of the invention a monitoring circuit included in the evaluation unit is provided at least for monitoring whether the connected line has a line defect and for passing on the information about the line defect to the postprocessing circuit. Such a line defect is also taken into account by the postprocessing circuit. This postprocessing circuit causes the generator circuit to generate OAM cells which contain AIS or RDI information signals.

The table further contains an entry for each VC, which entry refers to the associated VP. As a result, it is possible to simply form statuses of the VCs in response to statuses of the associated VP.

These and other aspects of the invention will be apparent from and elucidated with reference to the embodiments described hereinafter.

DETAILED DESCRIPTION OF THE PREFERRED EMBODIMENTS

Figure 1:
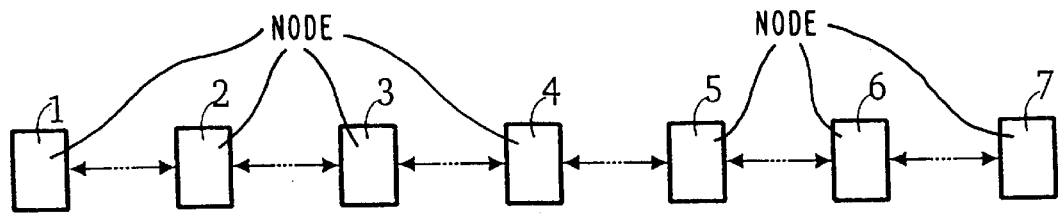
FIG. 1 shows part of a transmission system comprising network nodes.

FIG. 1 shows part of a transmission system comprising seven network nodes 1 to 7. Such network nodes may be, for example, switching centres, cross-connects or regenerative repeaters. Information signals are transmitted in the transmission system in fixed-length packets (cells) in the asynchronous transfer mode. A cell consists of a 5-byte-long header field which contains control information and a 48-byte-long information field. The cells can meanwhile be shifted in a synchronous transport module (STM). A synchronous transport module is part of a signal according to the synchronous digital hierarchy (SDH) standard, or the synchronous optical network (SONET) standard.

There may be a virtual connection or a virtual path between the network nodes 1 and 7. A Virtual Connection is referenced a VC. A plurality of VCs are combined to a Virtual Path which is referenced a VP. A VP is featured by a Virtual Path Identifier VPI and a VC is featured by a Virtual Connection Identifier VCI plus the respective virtual path identifier VPI in the header field of a cell. These identifiers may be changed in various network nodes, for example, when a cell goes from the network of one system operator to the network of another system operator.

To ensure proper operation, the signalling of error conditions and the transport of monitor information signals (for example, relating to the availability and the efficiency of the system), cells which contain OAM data (OAM cells) in their information field, are exchanged between the network nodes (OAM=Operations Administration and Maintenance). Therefore, the network nodes have an evaluation unit for evaluating such OAM cells.

Figure 2:
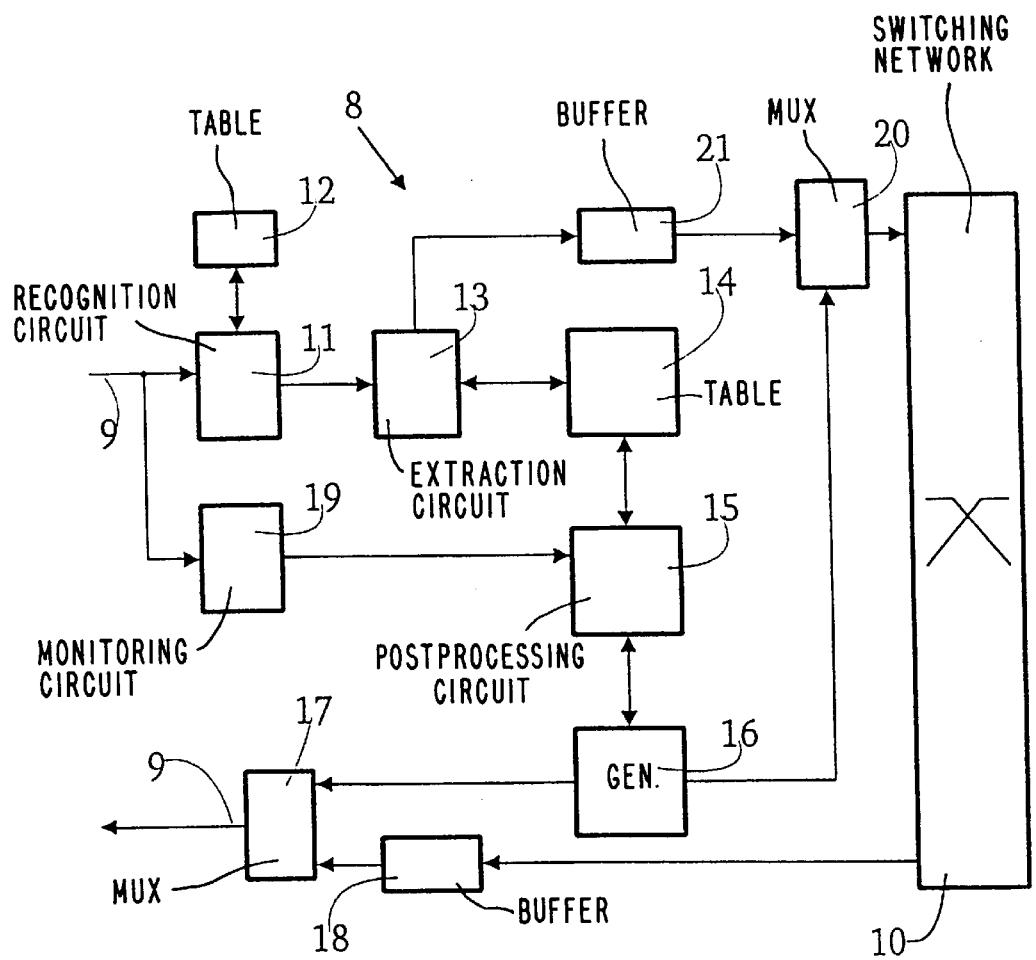
FIG. 2 shows a more detailed representation of a network node.

An embodiment for such an evaluation unit 8 is shown in FIG. 2 which unit is connected between a line 9 and a switching network 10. Instead of a switching network, it is also possible that a terminal unit is connected when the network node is located at the end of the connection (for example, network nodes 1 and 7 in FIG. 1). The evaluation unit 8 comprises a recognition circuit 11 and a first table 12 by which two elements the VPs and VCs and the type of cell are determined. The recognition circuit 11 learns the Virtual Connection Identifier VCI and the Virtual Path Identifier VPI from the header field of a cell supplied via line 9 and applies these identifiers to table 12. Table 12 supplies the VP and—if available—an associated VC to the recognition circuit 11. Furthermore, the recognition circuit 11 includes a decoder which determines the type of cell on the basis of data of the header field. This decoder in the recognition circuit 11 evaluates the Virtual Path Identifier VPI, the Virtual Connection Identifier VCI, a Payload Type Identifier PTI and a bit in the header field, which bit is referenced CLP (Cell Loss Priority) and indicates the priority of the cell.

The decoder determines the type of cell according to the following table:

| Type of cell | VPI | VCI   | PTI | CLP |
|--------------|-----|-------|-----|-----|
| Payload      | XXX | >001F | 0xx | x   |
| F4SEG        | XXX | 0003  | 0x0 | x   |
| F4ETE        | XXX | 0004  | 0x0 | x   |
| F5SEG        | XXX | zzzz  | 100 | x   |
| F5ETE        | XXX | zzzz  | 101 | x   |

The decoder thus detects whether a payload cell or an OAM cell of the type F4SEG, F4ETE, F5SEG or F5ETE is present. In the case of a cell of the type F4SEG or F5SEG, the cell contains OAM data of only one section of a connection. OAM data about the end-to-end connection are available in either of the other two types of cells F4ETE, F5ETE. Further, the cell types F4SEG and F4ETE relate to a VP and cell types F5SEG and F5ETE to a VC. Other types of cells which may occur may be featured either as payload data or as an irrelevant type of cell. The figure X occurring in the table represents a hexadecimal number, the figure x a binary number and the figure Z a hexadecimal number except for 0. The table mentioned above is taken from the standardization proposal ITU-T-I.610.

The recognition circuit 11 transfers the buffered cell, the data produced by the table 12 and the type of cell recognized by the decoder to an extraction circuit 13 also included in the evaluation unit 8. The extraction circuit 13 extracts data (status information) from the information field of the received cell only if the type of cell is F4SEG, F4ETE or F5SEG or F5ETE. In the other cases the cell buffered in the extraction circuit 13 is transferred without data being extracted therefrom.

From the information field of a cell is extracted, for example, AIS information (AIS=Alarm Indication Signal), or RDI information (RDI=Remote Defect Indication) in the extraction circuit 13. The AIS information indicates, for example, that there is a line defect and the RDI information indicates, for example, that there is a line defect in the opposite direction. The extraction circuit 13 is coupled to a table 14 which has specific entries for all the VPs and VCs. The extraction circuit 13 extracts specific data from the table 14 which are stored in the VP and VC of the arrived cell. Each VP and VC is assigned status information announcing whether AIS information, RDI information or other information has arrived. Depending on optionally available AIS, RDI, VPI, VCI or PTI information, the type of cell and further information signals, the data of the VPs and VCs are processed and returned to the table 14. If there is no VC (network nodes only for VPs), the processing steps necessary for the VCs are omitted.

A postprocessing circuit 15 which forms part of the evaluation unit 8, as does table 14, is coupled to the table 14. The postprocessing circuit 15 periodically extracts from the table 14 data which relate to a VP or VC and processes these data. This means that in the postprocessing circuit 15 the data of all the VPs and VCs are processed consecutively.

There is assumed, for example, that there are two VPs where VPI=1 and VPI=2, and three VCs where VPI=1/VCI=

10, VPI=1/VCI=11 and VPI=2/VCI=12. The table 14 then shows, for example, the following entries:

| Address | Type | VPI | VCI | VP_REF | ... |
|---------|------|-----|-----|--------|-----|
| 0 | VP | 1 | — | — | |
| 1 | VP | 2 | — | — | |
| 2 | VC | 1 | 10 | 0 | |
| 3 | VC | 1 | 11 | 0 | |
| 4 | VC | 2 | 12 | 1 | |
| ⋮ | | | | | |

Each connection in this table is assigned to an address. The table contains at least the type of connection (VP or VC), VPI, VCI and a reference entry VP_REF which entry features the associated VP for a VC. Instead of one common table it is also possible that two separate tables are used for all the VPs and also for all the VCs.

In the postprocessing circuit 15 first the data of the VP, with VP=1, buffered in table 14 are processed and, after being processed, these data are returned to table 14. The VP, with VPI=1, will not be re-processed by the postprocessing circuit 15 until this circuit has processed the VP, where VPI=2, and the VCs where VPI=1/VCI=10, VPI=1/VCI=11 and VPI=2/VCI=12, as well as all further entries of table 14.

In the postprocessing circuit 15 there is verified, for example, whether a line defect, AIS information and so on is present and whether this is to be announced via line 9 to a network node by means of an OAM cell which contains RDI information or via the switching network 10 by an OAM cell which contains AIS information.

For example, a line defect on line 9 is detected by a monitoring circuit 19 which then announces this fact to the postprocessing circuit 15. It is also possible that an error of line 9 is detected and announced by an external facility. OAM cells which contain AIS or RDI information are generated by a generator circuit 16 which thereto receives the indication from the postprocessing circuit 15. The generator circuit 16 then forms an OAM cell. The header field of this cell is filled with the appropriate information signals from the table 14 and the AIS or RDI information is inserted into the information field of the OAM cell.

If the newly formed OAM cell contains RDI information, the latter is transferred from the generator circuit 16 to a multiplexer 17 which immediately inserts the OAM cell into the cell stream of line 9. An appropriate control command for the multiplexer 17 is generated by the generator circuit 16. If, meanwhile, cells were sent from switching network 10 to line 9, they are buffered in a buffer store 18 and transferred to line 9 at a later stage via multiplexer 17. An OAM cell which contains AIS information, is applied to the switching network 10 via a further multiplexer 20 controlled by the generator circuit 16. Cells coming from the extraction circuit 13 are buffered in a buffer store 21 which is connected between extraction circuit 13 and multiplexer 20. The buffer store 21 may also be coupled to the input of the recognition circuit 11 instead of to the multiplexer 20.

Various connection-related independent processes run in the extraction circuit 13 and the postprocessing circuit 15. The table 14 is accessed then. As discussed above, status information signals and further statuses derived from the status information signals (for example, AIS status of the connection) are stored in the table.

The AIS information signals are processed via a process. The table 14 contains one memory cell for each connection which is referenced AISD and denotes whether this connection is in the AIS status (AISD>0). AISD represents a binary coded integer. The AIS status is adopted if a single OAM cell which contains AIS information has arrived. This is detected by the extraction circuit 13 and in table 14 the memory cell AISD for this connection is set, for example, to the value 6. The AIS status is abandoned when a single cell of this connection arrives that contains payload. This is also detected by the extraction circuit 13 which resets in this case the memory cell AISD to the value 0. The AIS status is also abandoned if for a given period of time no further OAM cells containing AIS information for this connection has arrived. This period of time is 2.5s±0.5s according to the current standardization proposal (ITU-T I.610). All further subsequent time conditions relate to this standardization proposal ITU-T I.610. To achieve this, the postprocessing circuit 15 decrements the value of AISD for the connection currently to be processed by a fixed period (in this illustrative embodiment the period should be 0.5s). All the connections are processed in the postprocessing circuit in one period. The AIS status is announced, for example, to a network management not further shown here. This process discussed above may be represented by the following routine:

Routine in the extraction circuit 13 for VP.
If there is a cell type F4ETE which contains AIS information, then:
    AISD=6;
otherwise, if there is a payload cell:
    AISD=0;
Routine in the extraction circuit 13 for VC.
If there is a cell type F5ETE which contains AIS information, then:
    AISD=6;
otherwise, if there is a payload cell:
    AISD=0
Routine in the postprocessing circuit 15:
If AISD>0, then:
    AISD=AISD-1;
otherwise:
    AISD=0;

A second process is used for evaluating the RDI information in table 14. Table 14 contains one memory cell for each connection, which cell is referenced RDID and denotes whether this connection is in the RDI status (RDID>0). RDID represents a binary-coded integer. The RDI status is taken if a single OAM cell containing RDI information has arrived. This is detected by the extraction circuit 13 and the extraction circuit 13 sets the memory cell RDID for this connection in table 14, for example, to the value 6. The RDI status is abandoned if no further OAM cell containing RDI information for this connection has arrived for a predetermined period of time. This period of time is, as observed before, 2.5s±0.5s. To achieve this, the postprocessing circuit 15 decrements the value of RDID by a fixed period (in this illustrative embodiment the period should be 0.5s). The RDI status is announced, for example, to the network management. This process discussed hereinbefore, may be represented by the following routine:
Routine in the extraction circuit 13 for VP.
If there is a cell type F4ETE which contains RDI information, then:
    RDID=6;
Routine in the extraction circuit 13 for VC.
If there is a cell type F5ETE which contains RDI information, then:

RDID=6;
Routine in the postprocessing circuit 15:
If RDI>0, then:
    RDID=RDID-1;
otherwise:
    RDID=0.

A third process is used for generating OAM cells containing an AIS information signal. Such an OAM cell is only generated at a network node that does not lie at the beginning or end of a VP or VC (network nodes 2 to 6 in FIG. 1). In that case there is a respective entry in table 14. The OAM cells are then generated if, for example, a line defect of line 9 has been detected, or if in a VC an AIS status of the associated VP has been detected. In this context there should be presupposed that for sending an OAM cell which contains an AIS information signal, a maximum of 0.5s must be available and consecutive OAM cells must be sent Is apart. Therefore, the duration of 0.5s is also selected as a period for the postprocessing.

In addition, a further status for each connection, which status is referenced AISN and indicates whether for this connection an OAM cell which contains an AIS information signal is to be generated by the generator circuit 16, is stored in table 14. AISN represents a binary-coded integer. The process may be described by the following illustrative routine for the postprocessing circuit 15:
Routine in the postprocessing circuit 15:
If either a line defect occurs or, in the case of a VC, there is an AIS status of the associated VP (AISD(VP_REF)>0), then:
    If AISN=0, then:
        AISN=(AISN+1)(mod2);
        If there is a VP, then:
            An OAM cell of the type F4ETE which contains AIS information is sent;
        Otherwise:
            An OAM cell of the type F5ETE which contains AIS information is sent;
    otherwise
        AISN=(AISN+1)(MOD2);
otherwise:
    AISN=0.

In the case of a line defect, or a VC having the value AISD(VP_REF)>0, there is verified whether AISN is equal to 0. For determining AISD(VPREF), the respective table entry to which VP_REF refers is accessed and the associated value of AISD of the corresponding VP is read out.

If AISN is equal to 0, AISN is incremented modulo-2 and an OAM cell is formed. If there is a VP, the postprocessing circuit 15 causes the generator circuit 16 to generate an OAM cell of the type F4ETE which contains an AIS information signal. Otherwise—in the case of a VC—the generator circuit 16 is instructed to generate an OAM cell of the type F5ETE which contains an AIS information signal.

If AISN is not equal to 0, AISN is incremented modulo-2. No OAM cell is generated. The purpose of this is to adhere to the distance in time of Is between two consecutive OAM cells which contain an AIS information signal. If not 0.5s is chosen for this period, the modulo operator is to be modified accordingly.

If the conditions for generating an OAM cell are not satisfied, AISN is set to 0.

A further process is used for generating OAM cells which contain an RDI information signal. Such an OAM cell is generated only in a network node that lies at the beginning or end of a VP or VC (network nodes 1 and 7 in FIG. 1). In that case, there is also an respective entry in table 14. An OAM cell is generated if, for example, a line defect on line 9 has been detected, or an AIS status (AISD>0) has been recognized for this line, or an AIS status of the associated VP has been detected in a VC. There should be presupposed in this context that a maximum of 0.5s is available for sending an OAM cell which contains an RDI information signal and that consecutive OAM cells are to be sent 1s apart. Therefore, also the duration of 0.5s is chosen as a period for the postprocessing.

Furthermore, in table 14 there is one memory cell per connection vailable for the status referenced RDIN which indicates whether an OAM cell which contains an RDI information signal is to be generated for this connection by the generator circuit 16. RDIN represents a binary-coded integer. This process can be described by the following routine by way of example for the postprocssing circuit 15:
Routine in the postprocessing circuit 15:
If either a line defect or an AIS status (AISD>0) occurs, or, in the case of a VC, there is an AIS status of the associated VP (AISD(VP_REF)>0), then:
    If RDIN=0, then:
        RDIN=(RDIN+1)(mod2);
        If there is a VP, then:
            An OAM cell of the type F4ETE which contains RDI information is sent; otherwise:
            An OAM cell of the type F5ETE which contains RDI information is sent;
    otherwise:
        RDIN=(RDIN+1)(MOD2);
otherwise:
    RDIN=0.

In the case of a line defect or an AIS status (AISD>0) or in the case of a VC having the value AISD(VPRF)>0, there is verified whether RDIN is equal to 0. If RDIN is equal to 0, RDIN is incremented modulo-2 and an OAM cell is formed. In the case of a VP, the postprocessing circuit 15 instructs the generator circuit 16 to generate an OAM cell of the type F4ETE which contains an RDI information signal. Otherwise,—in the case of a VC—the generator circuit 16 is instructed to generate an OAM cell of the type F5ETE which contains an RDI information signal.

If RDIN is unequal to 0, RDIN is incremented modulo-2. An OAM cell is not generated. The purpose is to maintain the time distance of 1s between two consecutive OAM cells which contain an RDI information signal.

If the conditions for generating an OAM cell are not given, RDIN is set to 0.

The same routine may be carried out in parallel for VPs and VCs with the ell types F4SEG and F5SEG. Furthermore, the extraction circuit 13 and the postprocessing ircuit 15 could process further status information to recognize other types of defects as roduced, for example, by the continuity check mechanism.

What is claimed is:
1. A transmission system comprising a plurality of network nodes for receiving and transmitting packets which contain connection-related status information signals about the transmission system, characterized in that a network node comprises at least one evaluation unit for evaluating OAM cells transmitted in an asynchronous transfer mode, said evaluation unit comprising:
    means for storing status information signals extracted from a packet in a table,
    means for determining, irrespective of an order of received packets, current, connection-related statuses in a given order for each connection based upon any statuses previously stored in the table and determined thus far, as well as on the received, connection-related status information signals, a recognition circuit for recognizing the type of OAM cell, the virtual path and, if available, the virtual connection, an extraction circuit for extracting, at least for certain OAM cells, status information signals and transfering the status information signals to the table, a further generator circuit, and a postprocessing circuit including:
   means for periodically extracting data relating to a connection from the table,
   means for determining and storing in the table current, connection-related statuses, and
   means, responsive to certain statuses, for sending a control command to said generator circuit for causing said generator circuit to generate OAM cells, one period between OAM cell generation corresponding to the duration necessary for computing statuses of all the connections.

2. A system as claimed in claim 1, characterized in that the evaluation unit further comprises a monitoring circuit for monitoring whether a connected line has a line defect and for passing on information about the line defect to the postprocessing circuit.

3. A system as claimed in claim 1, characterized in that the evaluation unit further comprises:

a multiplexer for transferring either (a) cells coming from a switching network in the network node, or (b) priority cells coming from the generator circuit, a buffer store for buffering the cells coming from the switching network, another multiplexer for transfering either (c) cells coming from the extraction circuit or (d) priority cells coming from the generator circuit, and a further buffer store for buffering the cells coming from the extraction circuit.

4. A system as claimed in claim 3, characterized in that the evaluation unit further comprises a monitoring circuit for monitoring whether a connected line has a line defect and for passing on information about the line defect to the postprocessing circuit.

* * * * *